United States Patent [19]
Kikinis

[11] Patent Number: 5,365,230
[45] Date of Patent: Nov. 15, 1994

[54] INDUCTIVELY COUPLED KEYBOARD

[75] Inventor: Dan Kikinis, Sunnyvale, Calif.

[73] Assignee: Cordata, Inc., Tortola, Virgin Islands (Br.)

[21] Appl. No.: 31,805

[22] Filed: Mar. 15, 1993

[51] Int. Cl.$^5$ .............................................. H03M 11/00
[52] U.S. Cl. ........................................ 341/22; 341/26; 341/32
[58] Field of Search ............................... 341/22, 26, 32

[56] References Cited

U.S. PATENT DOCUMENTS 4,765,218  8/1988  Eppingen ........................... 341/32
5,027,115  6/1991  Sato et al. ........................... 341/32

FOREIGN PATENT DOCUMENTS 09143  5/1992  WIPO ........................... H03M 11/20

*Primary Examiner*—James J. Groody
*Assistant Examiner*—Glenton B. Burgess
*Attorney, Agent, or Firm*—Donald R. Boys

[57] ABSTRACT

A self-contained keyboard for computer transmits keystroke data to a host computer via scan codes encoded in a variable magnetic field. In a preferred embodiment the keyboard generates magnetic bursts by electrical current bursts in a loop of a electrical conductor. A receiving loop connected to demodulator circuitry in the body of the computer produces emf spikes according to the magnetic bursts transmitted from the keyboard. The demodulator circuitry reproduces digital scan codes in a register for communication to the computer CPU according to the emf spikes monitored from the receiving loop.

10 Claims, 4 Drawing Sheets

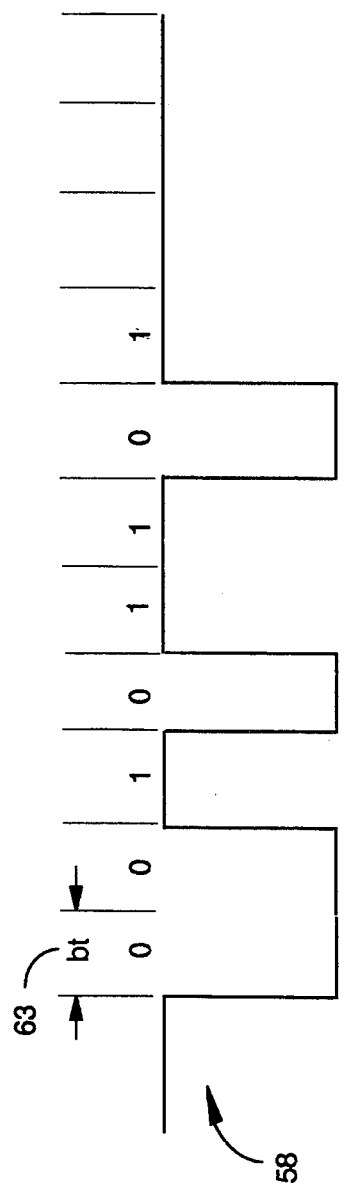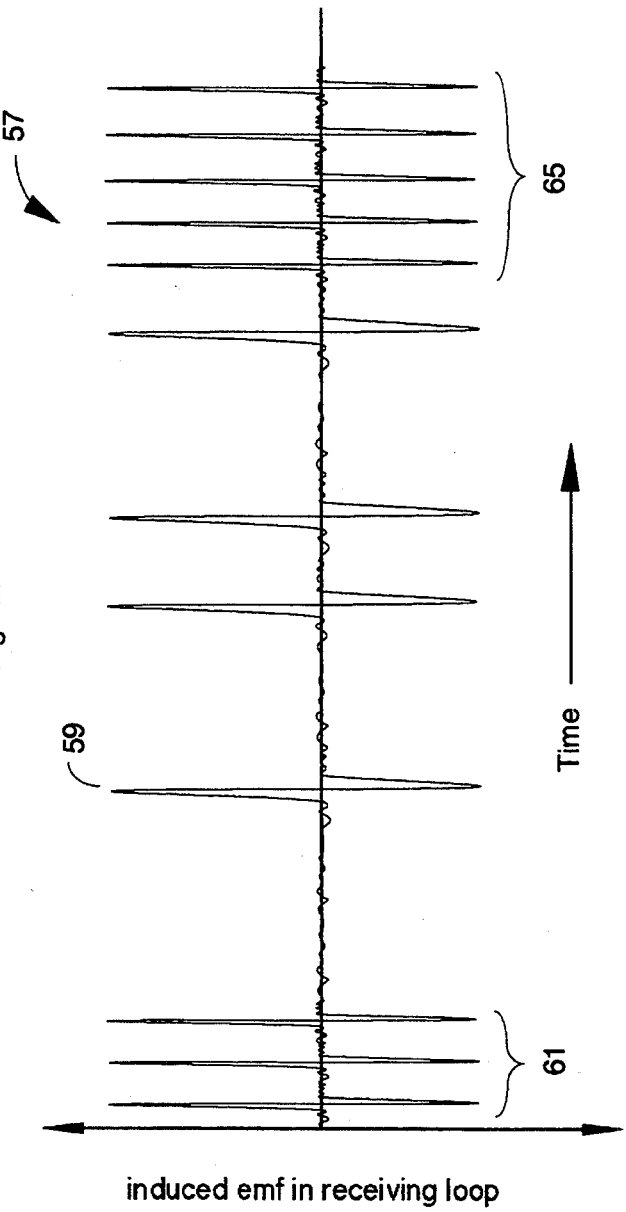

INDUCTIVELY COUPLED KEYBOARD

FIELD OF THE INVENTION

The present invention relates to keyboard input devices, particularly for computers, and more specifically to methods of transmitting input data from a keyboard to the computer or other device to which the keyboard is coupled.

BACKGROUND OF THE INVENTION

All computer systems require user input to perform dedicated functions. In some cases the only input needed is a signal to commence processing according to a preprogrammed list of instructions, typically called a program.

There are dedicated computer systems for receiving special signals, and for automatically processing the signals to some purpose, and storing or displaying a result. An example would be a computerized environmental monitoring station. More commonly, however, computer systems need periodic, and often frequent, alphanumeric and geometric input. This need for frequent alphanumeric and geometric input is typical of what are often termed "general-purpose" computers in the art, which include personal computers of all types, such as desk-top and portable computers.

Typically general-purpose computers have keyboards for alphanumeric input and pointing devices, such as a "mouse" or a trackball for geometric input. Alphanumeric input is useful for such as word processing applications, and geometric input for such as graphic applications. General-purpose computer systems, as a result, almost invariably have keyboards, simulating typewriter keyboards, as an interface for user input.

Keyboards for computers are demanding projects for electromechanical designers, and are arguably the most used and abused part of a computer system. The keyboard, moreover, is a relatively intricate mechanical system, typically requiring a number of moving and interacting parts, and the parts must be capable of being exercised many thousands of times without failure.

Keyboards, too are subject to a constant rain of foreign matter, none of which is usually beneficial to operation. Dust, dirt, moisture, spilled liquids, skin and fingernail material, and more, are common intruders to a keyboard. A good keyboard design has to protect the working elements form intrusion of foreign matter.

Another demanding aspect of keyboard design is the matter of assembling the keystroke data and transmitting the data to the computer or computerized system served. There are a number of different ways keys may be implemented and keystrokes may be detected and converted to data at the host system. Typically the key switches are arranged in a matrix and the rows of the matrix are scanned. This is the multiplexed interface. This can be done in a software-based mode using the host system's CPU, but there are a number of advantages to having an on-board microprocessor at the keyboard.

Typically, for a keyboard with an on-board microprocessor, keystroke data is fed to the microprocessor to be processed, coded, and transmitted. The most common transmission mode is over a serial connecting cable to the hose system. When the host computer receives a scan code, the keyboard controller notifies the CPU that a scan code is available to be read.

A good reference on keyboard technology is *Microprocessor Based Design*, by Michael Slater, pages 287–303, Copyright 1989 by Prentice Hall. Another is *The Winn Rosch Hardware Bible* by Winn Rosch, pages 239–257, Copyright 1989 by Winn L. Rosch, and published by Prentice Hall. These sections of the two references are incorporated herein by reference.

The coupling of the keyboard to the host computer by a cable is often restrictive and clumsy. When desk space is limited, for example, space for the cable may be a problem. The length of the cable restricts the position of the keyboard relative to the computer as well. And the cable is another component subject to failure, such as by poor connection at either of two end connectors. There have been attempts prior to the present invention to couple a keyboard to a computer without a cord. For example, IBM introduced the PC Jr. computer with two infra-red emitting LEDs to send out scan codes optically. The system was not very reliable however, and was limited to line-of-sight transmission.

What is needed is an apparatus and method allowing a keyboard to communicate with the host without the necessity of a cable in a manner that is reliable, and not restricted to line-of-sight transmission.

SUMMARY OF THE INVENTION

In a preferred embodiment a keyboard input device for a computer comprises an array of user-operable key means for entering data and commands, a microprocessor-based control means for managing operations of the keyboard, electrical connection means connecting the key means to the control means, a power supply for providing power to keyboard elements, and a magnetic field generator managed by the control means for transmitting digital scan codes by a varying magnetic field generated by the magnetic field generator.

The magnetic field generator in the preferred embodiment is a loop of electrical conductor wherein current bursts timed by the control means create magnetic field bursts. The timing is according to digital scan codes representing key actions.

In one embodiment a scan code receiver is provided within the main body of a host computer for receiving magnetically encoded serial signals from the keyboard, and converting the data to digital scan codes for use by the CPU of the computer. In this embodiment the receiver is an electrical conductor loop connected to demodulation circuitry, such that the magnetic bursts are converted to emf spikes which are monitored and used to reconstruct the digital scan code in a register for communication to the computer CPU.

A computer system is provided in one aspect of the invention having both a keyboard with a magnetic transmission means for scan codes, and a receiving and demodulation means for converting the magnetically transmitted code back to digital form.

The invention provides a keyboard without need for a cable connection, and without relying on line-of-sight transmission, in a relatively inexpensive and reliable manner.

BRIEF DESCRIPTION OF THE DRAWINGS

FIG. 4A is an exemplary trace of emf in a receiving loop according to an embodiment of the invention.

FIG. 4B is a serial digital scan code as reconstructed form the magnetically encoded code of FIG. 4A.

DESCRIPTION OF THE PREFERRED EMBODIMENTS

Figure 1:
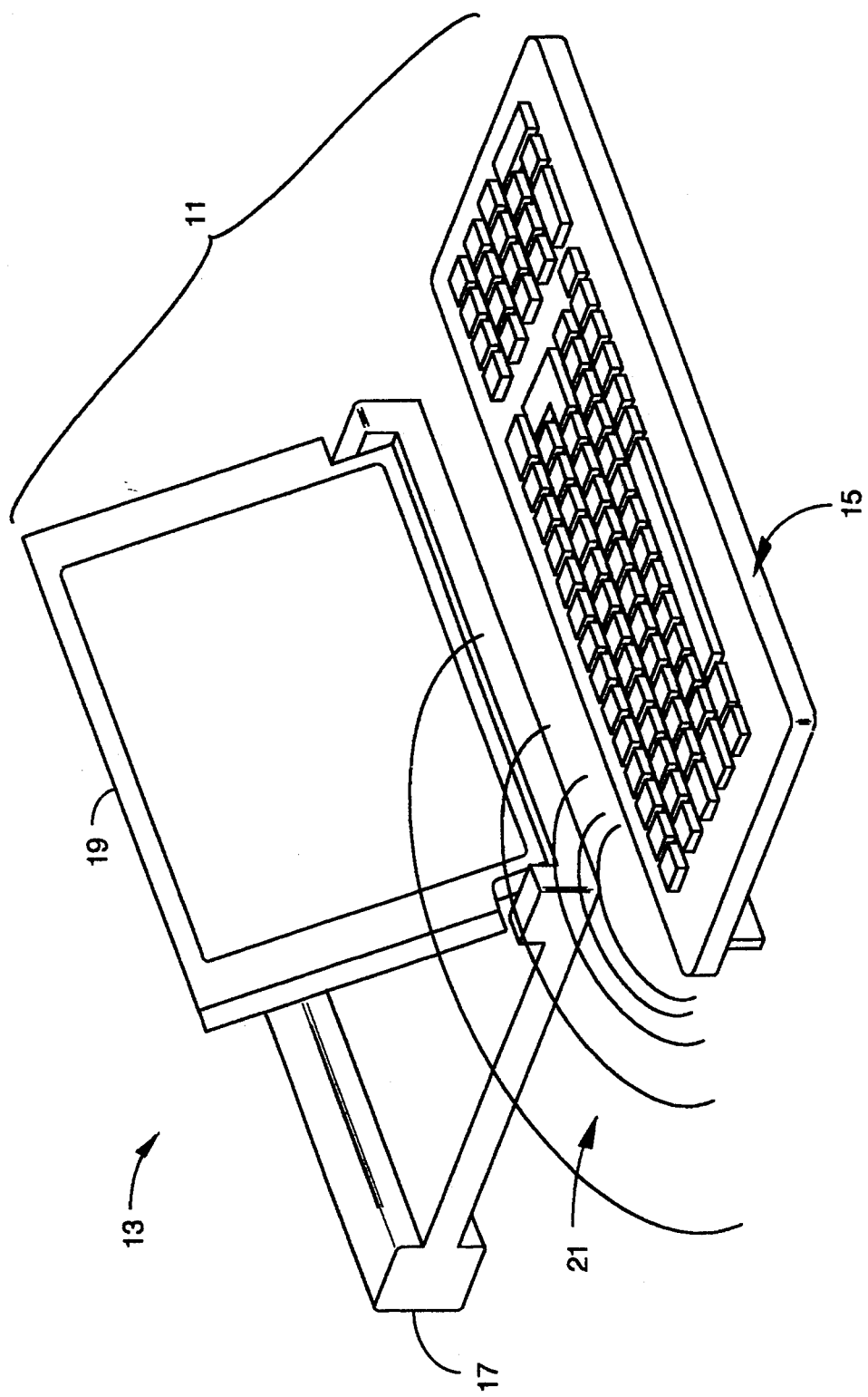
FIG. 1 is a perspective view of a computer with a keyboard according to the present invention.

FIG. 1 is an isometric view of a general-purpose portable computer with a keyboard coupled by induction apparatus according to the present invention. The computer system of FIG. 1 comprises a principle unit 13 including a housing 17 and a tilt-up display 19. The display may one of several types of available of flat-panel displays. Housing 17 contains the principal electronic operating elements, such as a CPU microprocessor, an I/O bus, and system Ram memory. There are connectors (not shown) for connecting to serial devices and the like, which is typical for portable computers.

A separate keyboard unit 15 provides alphanumeric and other keystroke input without benefit of a cable connection, by means of encoded information transmitted on a magnetic field represented by magnetic lines of force 21.

Figure 2:
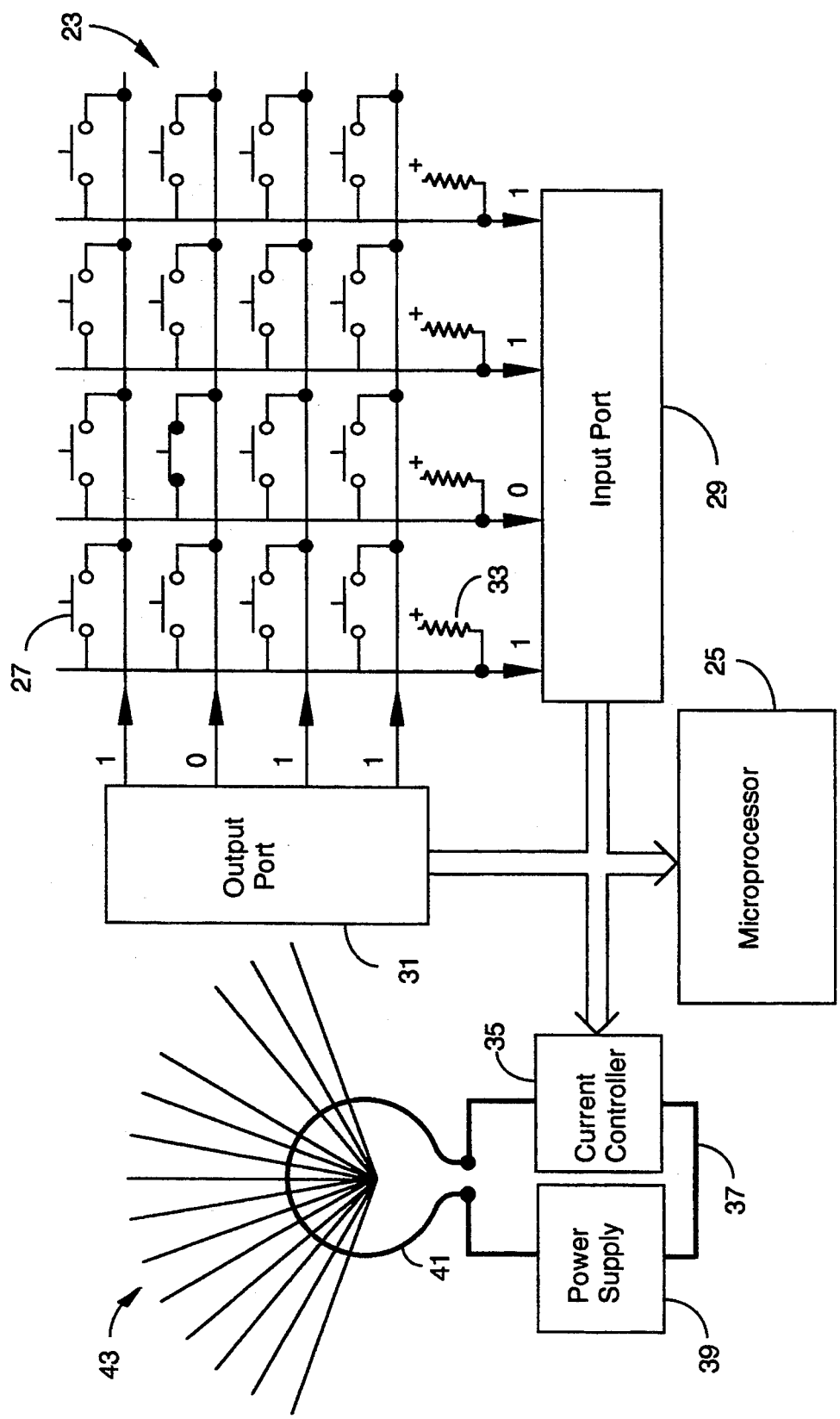
FIG. 2 illustrates a key switch matrix interfaced to a microprocessor and a magnetic transmitter according to the present invention.

FIG. 2 is a schematic illustrating some of the internal elements of keyboard 15. In this particular embodiment the key switches (hereinafter the keys) are connected in a matrix 23 and scanned by a microporcessor 25 contained within the frame work of the keyboard. The scanned matrix arrangement greatly reduces the number of I/O port bits needed for large numbers of keys. This scanned matrix arrangement is but one of a number of convention means by which the key operations may be recognized by an on-board microprocessor, and is used here as an example. The invention may actually be combined with virtually any means known in the art for recognizing and coding the keystrokes. Further, there are a number of other conventional features about keyboards that are not covered here because they have little bearing on the invention. For example, keyboards typically have a small number of indicative LED's for indicating Num Lock, Caps Lock, Scroll Lock, etc., and these features are not described herein.

The scanned matrix of FIG. 2 shows 16 keys interfaced to microprocessor 25 through a four-bit input port 29 and a four-bit output port 31. Pull up resistors (resistor 33 is an example), connected to an on-board, battery-driven power supply (the connections are not shown in FIG. 2), provide a high level at the input port when no keys a pressed in a column.

In scanning, the matrix is read one row at a time. One of the output port bits is set to 0 while all the others are set to 1. In FIG. 2 the second row down is being read. The keys in rows with the output bit set to 1 are effectively disabled, as pressing a key would only connect a high-level output port bit to an input port bit that is already pulled high by the pull-up resistor. The keys in the row driven by the 0 set bit are active. Pressing any key in the active row pulls the input port bit in the corresponding column low. Each row is read in turn, and the sequence is repeated indefinitely.

The matrix must be fully scanned at a rate to insure if a user quickly presses and releases a key, the contact will not be missed by the microprocessor. In fact, not only the making of a contact is recorded, but breaking as well, which allows for key combinations to be recorded. It will be apparent to those with skill in the art that with the schematic shown, key combinations may result in "ghost" key readings, but this potential problem is handled by placing a diode (not shown) in series with each key.

The 16 key matrix is provided as an example, and is extensible in a number of ways to more keys. For example, input and output ports with more bits may be used. One 16 bit input and one 16-bit output port will support a matrix of 256 keys. Alternatively more ports with four or eight bits may be used. Typically a complete keyboard scan is made once every few milliseconds.

In a conventional keyboard and in the present embodiment of the invention the on-board microprocessor converts the information derived from scanning to hexidecimal scan codes. Typical scan codes are shown in the Winn Rosch Hardware Bible referenced above, on pages 250 through 253, although other scan codes are usable, and new scan codes may be arbitrarily contrived.

In a conventional system, the microprocessor sends the scan codes serially over a four-wire cable, with one wire carrying all of the data. The main portion of the computer in the conventional case receives these scan codes at a special I/O port, where a keyboard controller chip issues an interrupt to the CPU that scan code is available to be read. The CPU then reads the scan code and interprets the key stroke information as input. The program for doing so is typically a part of the system BIOS.

In the system of the present invention there is no cable to transmit scan codes to the computer. In the embodiment shown by FIG. 2, microprocessor 25 operates a current controller 35 controlling current in a circuit 37 from a power supply 39. The controlled current passes through a one-turn generator loop 41, creating a magnetic field represented by exemplary field lines 43. In FIG. 2 generating loop 41 is shown in plan view, so magnetic field lines 43, which are generated orthogonal to the plane of the loop and conventionally circular in nature, are shown as lines.

Figure 3:
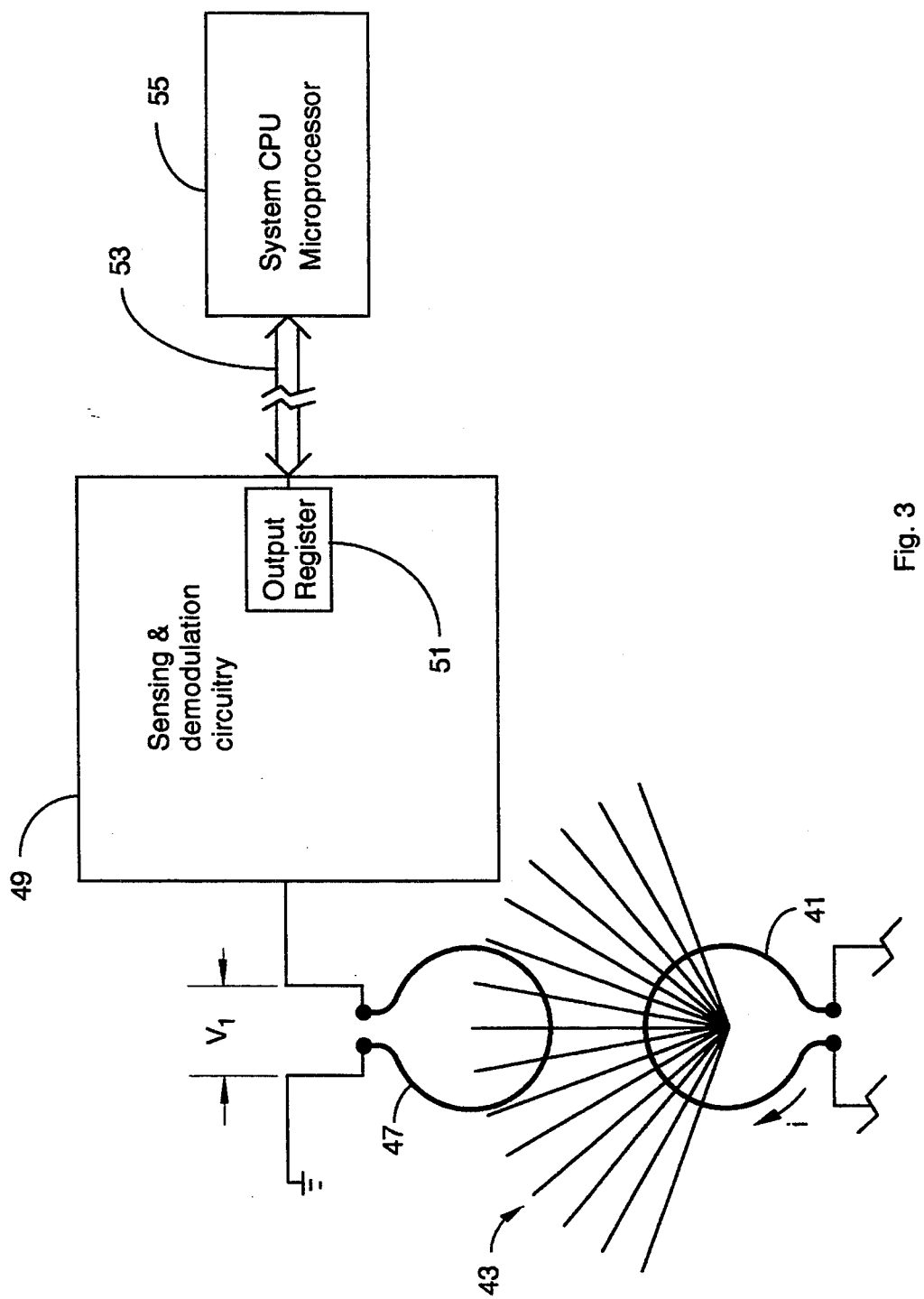
FIG. 3 illustrates a receiver and demodulation circuitry for receiving magnetically encoded scan codes and reconstructing the associated digital scan codes therefrom.

FIG. 3 shows generating loop 41 of FIG. 2 and a receiving unit 45 located in housing 17. Receiving unit 45 provides the function of the special I/O port that receives scan codes by serial cable for a conventional system, and forwards the codes to the system CPU. In one embodiment receiving unit 45 is implemented as an add-in card for a general-purpose computer, but in other embodiments, the receiving unit is a hard-wired unit in the computer housing. The latter is the preferred case for notebook, laptop, and other computers meant to be highly portable.

In the present invention information about keystrokes is transmitted to the system CPU via encoded magnetic fluctuations in field 43. Toward this end unit 45 has a receiving loop 47 for intercepting the magnetic field produced by loop 41. As is well known in field theory, there will be no effect in loop 47 unless there is a change in the strength of the magnetic field. To transmit information, then, it is necessary that the magnetic field be either expanding or collapsing.

As is known in the art of electrical engineering, there exists a defined property between two electrical circuits called mutual inductance. The mutual inductance determines the emf induced in one circuit as a consequence of a change in current in another. The direction of the emf in the one is, of course, a property of the current direction in the other.

In the embodiment of the present invention shown by FIGS. 2 and 3, a current i produced in loop 41 produces an emf $V_1$ in loop 2 by virtue of the change in magnetic field 43 produced by the change in the current in loop 47 from 0 to i (and from i to 0). To produce a detectable emf change across the ends of loop 47, current controller 35, driven by microprocessor 25 (FIG. 2) creates a finite burst of current in loop 41. As this current goes from 0 to i, a positive emf is produced in loop 47, and as the current in loop 41 drops back to 0, the emf magnitude in loop 47 changes to a negative value. The change in emf in the invention affords the ability to transmit scan codes.

It is empirically known and reflected in the concept of mutual inductance that the magnitude of the emf produced in one circuit by a current change in another is proportional to the rate of change of current with respect to time in the one, that is di/dt. Accordingly, the cross section of the transmitting loop is relatively large so as to not present an impediment of high resistance to a rapid rise of current as a result of imposing a voltage on the transmitting loop. In the present embodiment of the invention the transmitting loop is made of square conductor about 2 millimeters on a side and with a mean diameter of about 25 millimeters.

In the embodiment shown, the current for the transmitting loop and for other operations of the keyboard is provided by battery-based power supply 39. It is desirable therefore that the power requirements for the keyboard be kept to a minimum level. Nevertheless, it is also desirable to operate in a manner to avoid corruption of transmissions with spurious signals caused by ambient magnetic fields, due to current levels in other circuitry of the keyboard, the computer elements in housing 17, or other equipment that may be in the vicinity of the computer system according to the invention. In the described embodiment current in the transmitting loop is limited to several milliamps, and interference is handled at the receiving unit rather than by higher power requirements for the transmitter.

The induced emf in receiving loop 47 is monitored by sensing and demodulation circuitry 49 in the receiving unit according to control routines implemented as part of the system BIOS preferably, and an output register 51 is set up with received scan codes transmitted from the keyboard. As in a conventional demodulator, when a scan code is "ready" unit 49 issues an interrupt via I/O bus 53 to system CPU 55 that a scan code is available to be read. After a received scan code is read by the system CPU, the output register is reset for the next scan code received.

FIG. 4A is an exemplary trace of a received emf waveform 57 ($V_1$ across the ends of loop 47) as a result of managing i in transmitting coil 421 according to a pre-programmed code protocol. FIG. 4B shows a serial bit pattern 58 developed as a result of monitoring the received emf waveform.

In the transmission protocol of the embodiment exemplified by FIGS. 4A and 4B, as in a typical serial protocol, there is a pre-programmed bit time, (bt) 63 which is the reciprocal of the transmission rate (sometimes called the Baud rate). This bit time for scan code transmission need not tax the clock rate of most systems. For example, a very modes ten megahertz clock rate has a period of $10^{-7}$ seconds. Assuming, for example, a bit time of 1000 times the clock period and twelve bit times minimum to transmit one scan code, the code may be transmitted in $1.2 \times 10^{-1}$ seconds. Few people type that fast.

In the present example, the protocol consists of emf spikes across the ends of the receiving loop produced by current bursts in the transmitting loop. Keyboard microprocessor 25 (FIG. 2) reads the keystrokes, both make and break and key combinations, and sends the scan codes in serial bursts timed according to the bit time. Each current burst in loop 41 produces a spike such as spike 59 in loop 47 which spans about one-fourth of a bit time (this time may vary widely within the bit time).

The scan codes in the present embodiment are the conventional scan codes for U.S. IBM compatible keyboards as referenced above, but there are many alternative codes that might be used in other embodiments.

In FIG. 4 a code start signal is provided by three spikes 61 timed at twice the bit time rate. Circuitry 49 (FIG. 3) recognizes the code start signal and monitors the next eight bit times for spikes as indicative of data bits, setting an output register 51 according to the bits sensed. A bit time with a definite spike is a logical one, and a bit time with no spike produces a logical zero. After the eight bits are transmitted, the transmitter issues a stop code 65 of five spikes at twice the bit rate, and looks for another start signal. There are a wide variety of start and stop codes (signals) that might be employed in different coding schemes within the scope of the invention, and the means described is but one of the many.

The many code transmitted in the example of FIG. 4, 00101101, is hex 2D, which is the make code for the "x" key according to the protocol used in the preferred embodiment, which is the conventional scan codes used by most IBM compatible computer keyboard systems. As a user types on the keyboard the system according to the invention continues to interpret the key makes and breaks, and the key combinations used, and sends the scan codes to the computer via the transmission loop and the receiving loop.

It will be apparent to one with skill in the art that there are many alternations that may be made in the embodiments described without departing from the spirit and scope of the invention. A number have been mentioned above. There are many more. For example, there is a broad latitude in the dimensions of the transmitting and receiving loops, and in other variables, such as the current generated and the timing of coded data. Similarly, there are many coding schemes that may be used other than the scheme described in the preferred embodiment. There are many other variations within the spirit and scope of the invention.

What is claimed is:

1. A keyboard input device for a computer, comprising:
   an array of keys for entering data and commands;
   a microprocessor-based controller for managing operations of said keyboard;
   electrical conductors connecting said array of keys to said microprocessor-based controller;
   a power supply connected to power-using elements of said keyboard for supplying electrical power for the keyboard; and a magnetic field generator managed by said microprocessor-based controller for transmitting digital scan codes by a varying magnetic field generated by said magnetic field generator.

2. A keyboard input device as in claim 1 wherein said magnetic field generator comprises at least one loop of electrical conductor driven by a current control circuitry managed by said microprocessor-based controller, wherein magnetic bursts are created by current bursts provided in said at least one loop of electrically conductive material by said current control circuitry.

3. A keyboard input device as in claim 1 wherein said microprocessor-based controller comprises control routines for producing said digital scan codes identifying each keystroke make and break and key combinations, and for serially transmitting said digital scan codes via said varying magnetic field.

4. A keyboard input device as in claim 1 wherein said scan codes are transmitted as magnetic bursts in packets, each packet comprising a first timed burst sequence as a start signal, a following series of equal bit times representing 1 and 0 bits in the scan code, wherein a magnetic burst within a bit time represents a digital 1 value and the absence of a magnetic burst within a bit time represents a digital 0, and a second time burst sequence as a stop signal for the packet.

5. A code demodulator configured to interface to an I/O bus of a general-purpose computer, comprising:
a magnetic signal receiver for generating an emf in response to changes in a magnetic field coupling said receiver, and
monitoring circuitry connected to said magnetic signal receiver for detecting emf spikes generated in said magnetic signal receiver, for setting an output register with digital values according to timed receipt of emf spikes, and for issuing an interrupt signal to a CPU linked to said I/O bus.

6. A code demodulator as in claim 5 wherein said magnetic signal receiver comprises at least one loop of electrical conductor connected to said monitoring circuitry, providing an emf spike to said monitoring circuitry each time a magnetic field coupled to said at least one loop changes abruptly.

7. A code demodulator as in claim 5 where in said monitoring circuitry is operable by said CPU via said I/O bus to set successive bits of an output register with 1's and 0's according to receipt of emf bursts in series, wherein an emf burst in a bit time indicates a digital 1 and lack of an emf burst in a bit time indicates a digital 0.

8. A general-purpose computer comprising:
a CPU for managing operations of said computer;
an I/O bus interfaced to said CPU for communicating with peripheral devices;
a code demodulator interfaced to said I/O bus for monitoring coded magnetic signals and sending codes to said CPU in response to said coded magnetic signals; and
a physically unconnected keyboard comprising a magnetic generator for coding key operations as scan codes and transmitting said scan codes to said code demodulator by variable magnetic signals generated by said magnetic generator means.

9. A general-purpose computer as in claim 8 wherein said keyboard comprises at least one loop of electrical conductor driven by a current generator controlled by a microprocessor-based controller according to control routines configured to code key makes and breaks and combinations as digital scan codes transmitted serially as magnetic bursts produced by electrical current bursts in said at least one loop of electrical conductor.

10. A method for transmitting key actions accomplished by operating keys in a key array on a keyboard to a CPU of a general-purpose computer, comprising the steps of:
reading a key action on the keyboard by means of a matrix of discrete signal generators associated with said keys and connected to a microprocessor-based controller;
converting the key action to a digital scan code according to a specific digital scan code to key action correspondence;
transmitting the digital scan code serially by a series of magnetic bursts generated by a magnetic field generating means;
intercepting the serial magnetic bursts by means of a receiving loop connected to a demodulator circuit in the general-purpose computer;
setting a digital output register to the digital scan code according to the serial magnetic bursts representing the scan code; and
communicating the digital scan code from the digital output register to the CPU.

* * * * *